US006866158B1

(12) United States Patent
Sommer et al.

(10) Patent No.: US 6,866,158 B1
(45) Date of Patent: Mar. 15, 2005

(54) CLOSEABLE GLASS CONTAINER COMPRISING A PLASTIC COATING APPLIED BY INJECTION MOLDING AND METHOD FOR THE PRODUCTION THEREOF

(75) Inventors: Martin Sommer, Ockenheim (DE); Artur Fabian, St. Gallen (CH); Manfred Borens, Woerrstadt (DE); Jochen Heinz, Neumuenster (DE)

(73) Assignee: Schott Glas, Mainz (DE)

( * ) Notice: Subject to any disclaimer, the term of this patent is extended or adjusted under 35 U.S.C. 154(b) by 44 days.

(21) Appl. No.: 10/069,645

(22) PCT Filed: Aug. 23, 2000

(86) PCT No.: PCT/EP00/08224

§ 371 (c)(1),
(2), (4) Date: May 14, 2002

(87) PCT Pub. No.: WO01/15984

PCT Pub. Date: Mar. 8, 2001

(30) Foreign Application Priority Data

Aug. 27, 1999 (DE) .......................................... 199 40 706

(51) Int. Cl.[7] .............................. B65D 23/08; B29B 7/00
(52) U.S. Cl. .................... 215/12.1; 215/902; 264/328.6
(58) Field of Search ............................... 215/12.1, 12.2; 427/106, 407.2; 264/267, 328.6

(56) References Cited

U.S. PATENT DOCUMENTS

| | | | | |
|---|---|---|---|---|
| 2,991,896 A | * | 7/1961 | Glover et al. ............... 215/12.2 |
| 3,014,607 A | * | 12/1961 | Barnby et al. ................. 215/42 |
| 3,037,652 A | * | 6/1962 | Wallace ...................... 215/12.2 |
| 3,845,873 A | * | 11/1974 | Bridges ...................... 215/12.2 |
| 3,877,969 A | | 4/1975 | Tatsumi et al. |
| 3,889,031 A | * | 6/1975 | Tatsumi et al. ............. 428/216 |
| 4,053,076 A | * | 10/1977 | Vogel et al. ............... 215/12.2 |
| 4,093,759 A | * | 6/1978 | Otsuki et al. .............. 428/34.7 |
| 4,161,556 A | * | 7/1979 | Lenard et al. ............. 427/389.7 |
| 4,163,814 A | * | 8/1979 | Asai et al. ............... 427/372.2 |
| 4,207,356 A | * | 6/1980 | Waugh ........................ 427/521 |
| 4,280,944 A | * | 7/1981 | Saito et al. ................. 524/591 |
| 4,409,266 A | * | 10/1983 | Wieczorrek et al. ........ 427/302 |
| 4,426,348 A | | 1/1984 | Salisbury ................. 264/328.6 |
| 4,562,032 A | * | 12/1985 | Gaudreau .................... 264/267 |
| 4,569,869 A | * | 2/1986 | Kushida et al. ............ 428/35.7 |
| 5,105,957 A | * | 4/1992 | Mannl ......................... 215/47 |
| 5,300,334 A | * | 4/1994 | Niederst et al. ........... 428/35.7 |
| 5,852,106 A | * | 12/1998 | Wilmes et al. .............. 524/591 |
| 5,962,142 A | * | 10/1999 | Tachi et al. .............. 428/423.1 |

FOREIGN PATENT DOCUMENTS

| | | | | |
|---|---|---|---|---|
| DE | 11 08 383 | | 6/1961 | |
| DE | 2427151 A1 | * | 1/1975 | ................ 215/12.2 |
| DE | 24 31 952 | | 1/1976 | |
| DE | 155313 | * | 6/1982 | ................ 215/12.2 |
| DE | 3637335 A1 | * | 5/1988 | ........... B65D/90/02 |
| DE | 196 32 664 A1 | | 2/1998 | |
| DE | 196 32 664 A | | 2/1998 | |
| EP | 0 549 095 A | | 6/1993 | |
| EP | 0 780 315 A | | 6/1997 | |
| FR | 2 631 581 | | 11/1989 | |
| GB | 2071519 A | * | 9/1981 | ........... B65D/23/08 |
| JP | 349126710 A | * | 12/1974 | ................ 215/12.2 |

\* cited by examiner

*Primary Examiner*—Sue A. Weaver
(74) *Attorney, Agent, or Firm*—Michael J. Striker

(57) ABSTRACT

The container is a glass bottle (10) encased with a plastic coating (4) from its base section (3) to a sealing rim (2) around its mouth (M) in order to protect against shattering or explosive failure. The glass bottle, preferably a glass inlet, is fillable under pressure with a sprayable medically active substance and a propellant and provided with a delivery element attached to the sealing rim. To facilitate lower injection molding temperatures and pressures and to permit autoclaving at high temperatures the glass bottle with the plastic coating (4) is made by a method which includes injecting at least one reactively cross-linkable plastic capable of being heat-softened into a mold surrounding the glass bottle and forming the plastic coating (4) by a reaction injection molding (RIM) method.

18 Claims, 6 Drawing Sheets

CLOSEABLE GLASS CONTAINER COMPRISING A PLASTIC COATING APPLIED BY INJECTION MOLDING AND METHOD FOR THE PRODUCTION THEREOF

BACKGROUND OF THE INVENTION

1. Field of the Invention

The invention relates to a closeable container, especially a glass bottle or glass inlet, comprising a plastic coating applied by injection molding and also to an injection molding method of applying it.

2. Description of the Related Art

Glass containers of this type comprising a coating applied by injection molding are used for medical purposes in particular, but they are also used for cosmetic purposes or to store food and beverages. The purpose of these plastic coatings, for example, is to hold glass splinters together if the coated glass container breaks. The plastic coating therefore also serves to provide protection against bursting and/or shattering.

Glass containers of various species comprising a plastic coating applied in different fashions using the most diverse types of plastics have been made known in numerous publications.

In DE-OS 24 31 952 it was made known to coat glass bottles with a plastic that comprises a thermosetting resin that is softened before use, either by means of internal plasticizers, i.e., by means of substances that react during production of the thermosetting plastic and thereby become part of the resin, or by means of external plasticizers that are added to the finished resin in suitable fashion. The softened, thermosetting resin is available as coating powder, is ground to a specified particle size, and then applied electrostatically to the bottles. The application of the powder can also take place by means of immersion in a fluidized bed or in an electrostatic fluidized bed. The applied layer is then cured, preferably in an infrared oven. In this known case, the coating of the bottles therefore takes place using the method of powder coating on a thermosetting basis. This method does not permit exact shaping of the coated bottle, as required, for example, to shape the base section with regard for the stability of the glass bottle, and is also relatively costly.

Furthermore, the softened thermosetting resin cannot be applied to the glass bottles using the technique of injection molding, because this technique requires that a plastic molding compound be available that can be softened under the influence of heat, so that it can then be pressed into the molding die. By definition, thermosetting plastics are not capable of being heat-softened, however.

To the extent that glass containers have been put into concrete terms in the publications about the related art, containers such as beer bottles, mineral water bottles, cosmetic containers and the like are typically named. Additionally, the principles of coating glass containers by injection molding are also used with a special species of containers, namely closeable medical containers subject to a relatively high pressure. These pressurizable medical containers can be filled under pressure with medically effective substances and a propellant. These containers have an opening which is closeable using a delivery element, in particular a metering valve. A dispensing head is provided that interacts with the delivery element in such a fashion that the delivery element is actuated when both parts are pressed together. A certain quantity of the medically effective substance is then released through a spray opening as an aerosol. These products serve as applicators for medical applications, in particular for patients with asthma or other bronchopathies.

The use of pressure containers made of metallic materials for such applicators is known. The protection against bursting and/or shattering in pressure containers of this type is achieved by means of the properties of the selected material that are advantageous in this regard (high toughness, high strength).

A disadvantage of these metallic pressure containers, however, is that the nontransparent pressure container makes it impossible to visually determine how much of the substance to be released remains inside. This is a particular disadvantage when it comes to dispensing inhalants that often have the character of an emergency remedy (e.g., asthma preparations). Without a visual check, the risk exists that the pressure container could be empty when an emergency arises.

Additionally, a pressure container in the form of a small glass bottle was made known in DE-AS 11 08 383. The capacity of the small glass bottle can be 5 to 50 ml. The release opening is located on the top end of the bottle. This is usually closed by inserting the delivery element, e.g., a metering valve having a usually cylindrical cannula projecting upward, into the pressure container or crimping it on the pressure container, often using an elastic seal between head and metering valve. The pressure container is thereby subjected to a relatively high internal pressure.

The known pressure container made of glass is covered with a coating of a transparent plastic that is sprayed on or applied via immersion, with the exception of the rim, to which the metering valve is crimped. This coating comprises a flexible soft plastic, e.g., PVC, having a great ability to stretch or expand. The great expandability is important, because, if the glass container bursts, the high internal pressure acts on the soft plastic. If the soft plastic of the coating could not yield to the high pressure by deformation, e.g., by a volume change of the coating jacket, a sudden destruction of the soft plastic resulting from chemical attack would be expected.

Since the pressure container is comprised of a transparent material (glass) and the plastic sheathing is transparent, this known pressure container has the advantage that it makes it possible to visually determine how much of the substance to be released remains inside.

A disadvantage of the known pressure container, however, is the fact that the transparent pressure container made of glass—despite its plastic coating—is not safe enough in case of explosion, e.g., caused by improper handling, because a coating is not applied in the region of the metering valve, or because, generally speaking, if bursting occurs, the plastic sheathing can expand and burst like a balloon, which causes parts of the glass container to spray rapidly into the surroundings, including the metering valve in particular, which can come loose from the rim to which it was crimped.

During the production of the final pressure container, the plastic layer that provides protection against bursting and shattering is applied directly to the glass pressure container in the simplest fashion possible—i.e., not by means of immersion or spraying—by coating this with an extruded plastic in a molding die. A concept of this type was made known in FR 2 631 581 B1. This publication describes a small glass bottle having a tapered neck section that can be filled under pressure with a substance sprayable as aerosol and a propellant, the opening of which is closeable using a delivery element, and that comprises a plastic coating applied by injection molding.

In the known case, the glass pressure container comprises a small bottle having a cylindrical neck section, and the molding die is designed so that a plastic coating is also applied by injection molding to the neck section flush with the opening of the small bottle. When the neck section of the small glass bottle is designed in this fashion, however, attachment of the delivery element—the metering valve—is not without problems. Furthermore, the plastic coating coats the small glass bottle completely. If bursting occurs, the coating can partly expand and burst and therefore lose its property of providing protection against bursting and shattering. The aforementioned publication furthermore makes no statement about the type of plastic material; it is therefore not considered to be essential in terms of function.

A further example of the aforementioned concept was made known in DE 196 32 664 A1. It discloses a small glass bottle having a tapered neck section that is fillable under pressure with a substance sprayable as aerosol and a propellant, the opening of which is closeable using a delivery element, that comprises a plastic coating applied by injection molding, and that is designed so that a secure attachment of the delivery element and a reduction of the wall thickness of the small glass bottle is possible and, on the other hand, the protection against bursting and shattering is increased considerably compared to the container made known in the FR publication. This known small bottle also comprises the following features:

the neck section comprises a sealing rim designed in the shape of a bead on the side where the opening is located for the mechanical attachment of the delivery element, which also comprises a plastic coating applied by injection molding, a plurality of pressure-compensating openings designed in the shape of holes is formed in the plastic coating of the glass body applied by injection molding, the coating is composed of an elastic plastic material having distinct shrinkage, and it is shrunk on the small glass bottle.

Due to the sealing rim designed in the shape of a bead, a secure and permanent mechanical attachment of the delivery element is possible. Since the plastic coating also covers the glass sealing rim, the delivery element is still held mechanically even if the glass body bursts, which increases the protection against bursting. The pressure-compensating openings prevent the plastic coating from expanding and bursting, which also greatly increases the protection against bursting and shattering.

If bursting occurs, the filled substance and the propellant can escape through these pressure-compensating openings. Furthermore, due to the fact that the contents of the glass container can escape, the risk that the filled substance will chemically attack the coating material, e.g., by means of stress corrosion cracking, is further reduced, which further reduces the risk of bursting.

By using an elastic plastic material having distinct shrinkage, it was found that the ability of the small glass bottle coated by injection molding to be pressure-loaded is higher than the ability of the pure glass bottle to be pressure-loaded, by many times over. This effect makes a thinner wall thickness of the small glass bottle possible. The elasticity of the plastic material thereby offsets the shrinkage.

The present invention described hereinbelow is based on a glass container of this type.

In the known case, specially designed small glass bottles, "glass inlets", are coated with a transparent plastic using the conventional injection-molding system. Since relatively viscous thermoplastics are typically used as plastic material in the conventional injection-molding system, very high injection pressures (approx. 300 bar) occur during injection molding, which can easily destroy the glass inlet. This destruction results in a high percentage of waste. Additionally, the productivity of a manufacturing system is greatly reduced. For this reason, limits are also placed on the reduction of the wall thickness of the glass inlets. The same applies for inlets made of a thermolabile plastic, especially a thermoplastic material.

Moreover, the known glass containers comprising a coating applied by injection molding cannot be sterilized by means of autoclaving using superheated steam at 121° C. for a period of 20 minutes. A sterilization method of this type is typically required for containers used for medical purposes, however.

SUMMARY OF THE INVENTION

It is an object of the present invention to provide a closeable glass container of the type initially described above or a thermolabile plastic container, which comprises a plastic coating applied by injection molding, and to carry out the method for its production in such a fashion that, despite the thin walls of the glass container or the thermolabile plastic container, it is possible to considerably reduce the waste produced during injection molding.

It is also an object of the present invention to provide glass containers with a coating applied by injection molding, which can be subjected to high temperatures, e.g., during sterilization using superheated steam.

These objects are successfully attained by a closeable container, which comprises a glass bottle or a thermolabile plastic bottle and a plastic coating encasing the closeable glass bottle or the thermolabile plastic bottle, wherein the plastic coating comprises a reactively cross-linkable plastic able to be heat-softened, which is applied to the bottle by a reaction injection molding (RIM) method.

With regard for the method for the production of glass containers designed as small glass bottles or glass inlets and having a plastic coating applied by injection molding, the object is successfully attained by a method according to the invention comprising the steps of:

Production of the entire small glass bottle or glass inlet having base section, cylindrical jacket section, tapered neck section including sealing rim designed in the shape of a bead, according to conventional glass technology, and then Coating of the entire small glass bottle or inlet by injection molding in a mold using at least one reactively cross-linkable plastic capable of being heat-softened, using the reaction injection molding (RIM) system.

When the reaction injection molding system (RIM system) is used according to the invention, at least one reactively cross-linkable plastic with low viscosity compared to polymers, e.g., a thermosetting resin, is injected in a mold around the insert—the glass container—at relatively low injection pressures (less than 10 bar) and relatively low mold temperatures.

Since only a low injection pressure is necessary, the thickness of the container walls can be reduced, while reducing waste at the same time. Moreover, the reactively cross-linkable plastics used are able to be subjected to higher temperatures than the thermoplastics typically used in the conventional injection molding system, such as PP, PE, PET, PS, as a result of which the containers comprising a plastic coating applied by injection molding are capable of being sterilized in autoclaves using superheated steam. The low mold temperatures also make it fundamentally possible to use inlets made of a thermolabile plastic.

Particular advantages are achieved according to one embodiment of the invention using a container developed as a small glass bottle that is capable of being filled under pressure with a substance sprayable as aerosol and a propellant, that comprises a tapered neck section having a sealing rim designed in the shape of a bead integrally molded on the side where the container opening is located for the mechanical attachment of a delivery element, by means of which the opening of the small glass container is closeable, and that is encased in the plastic coating in such a fashion that the plastic coating also encases the sealing rim designed in the shape of a bead. Small glass bottles of this type come onto the market in various stages of development. In the basic form, the small glass bottle is supplied without a delivery element installed. A commercial form having a delivery element installed is also feasible. The small glass bottle can thereby be filled or unfilled. All of these commercial forms use the small bottle according to the invention, however, and are therefore included in the scope of protection.

By using the RIM method, the entire production process used to manufacture the coated container—which is fillable under pressure with a substance sprayable as aerosol and a propellant ("aerosol containers")—can be simplified as well. The following possibilities result, for example:

By introducing different materials at different points in the mold, the material hardness can be increased specifically in the region of the container head in order to improve the quality of the crimping with a metering valve. The material properties in the jacket of the container can be optimized in terms of "binding splinters together".

Using the RIM method, it is also possible to cover containers with a plastic sheathing after they have been closed with a valve. This becomes possible because the mold temperatures in the RIM method can be a great deal lower than in the conventional injection-molding system and, within the framework of the RIM system, the valve cannot be damaged by temperatures that are too high. Additionally, the mechanical forces associated with injection are lower, which also reduces the likelihood of valve damage.

Due to the lower mechanical load during coating, the use of the RIM method also makes it possible to use thinner glass inlets with wall thicknesses in the range of 0.7–1 mm with plastic sheathing strengths in the range of 1–2 mm, so that compressed-gas packages can be produced specifically for use in application devices (injection pen systems, for example) using this method.

Coating can also be carried out more economically using the RIM method. On the one hand, faster process times are possible, which increases throughput. On the other hand, the molds are less expensive, which also results in an economical production of small item counts.

It was determined, surprisingly, that the use of reactive polyurethane systems in the RIM method eliminates the need to pretreat the outer surface of the glass inlet to achieve optimal protection against splintering.

When using thermoplastics that are applied in the conventional injection molding system, it must be ensured by means of separate process steps, for example, that—as described in the cited publication DE 196 32 664 A1—the bond between plastic and glass surface is very weak, so that, if the container breaks, cracks in the glass inlet cannot spread into the plastic sheathing. When using reactive polyurethane systems according to the RIM method, the splinter-binding effect is independent of the load-bearing capacity of the bond between glass and plastic sheathing, so that previously-named process steps can be eliminated.

Using the RIM method, components that may be mechanically and thermally loaded only minimally can be coated by injection molding. This results in further possibilities for the production of compressed-gas packages for application systems.

Aerosol containers, a preferred application of the container according to the invention, typically have the shape of a small glass bottle having a volume between 5 ml and 125 ml.

Using the RIM method, it is also possible to coat glass containers having a volume of more than 125 ml and up to 2000 ml.

As a result, these containers can fulfill TRG 300 requirements for compressed-gas packages.

As a result of the measures according to the invention, it becomes possible to produce containers in which fluids contained therein can be safely sterilized using superheated steam (at 121° C. or 134° C.). Under these sterilization conditions, high pressures are produced in the closed vessel that, alone, would lead to the destruction of the vessel.

Current glass laboratory bottles may therefore not be closed tightly when undergoing such a sterilization process, so that pressure compensation can take place. The plastic sheathing applied using the RIM method makes it possible, however, to optimize the glass inlet in terms of resistance to excess pressure and, in practical usage, it ensures safety it glass breaks.

Moreover, thermolabile inlets (thermoplastics, for example) are able to be coated.

The reaction injection molding method itself is known. It is described in the following book, for instance:

"Saschtiing, Hansjürgen. Kunststoff Taschenbuch, [*Plastics Handbook*] 24$^{th}$ Ed., published by Carl Hanser Verlag, Munich, Vienna, 1989, ISBN 3-446-1 5385–394", Various method variants are known.

Polyurethane, polyamine, and polyurea systems, and reactive resins, are known in particular as reactively crosslinkable plastics. Reference is made to the following book:

"Domininghaus, Hans. Die Kunststoffe und ihre Eigenschaften, [*Plastics and Their Properties*] 4$^{th}$ Ed., published by VDI-Verlag GmbH, Düsseldorf, 1992" for details.

BRIEF DESCRIPTION OF THE SEVERAL VIEWS OF THE DRAWING

The objects, features and advantages of the invention will now be illustrated in more detail with the aid of the following description of the preferred embodiments, with reference to the accompanying figures in which.

DETAILED DESCRIPTION OF THE INVENTION

Figure 1:
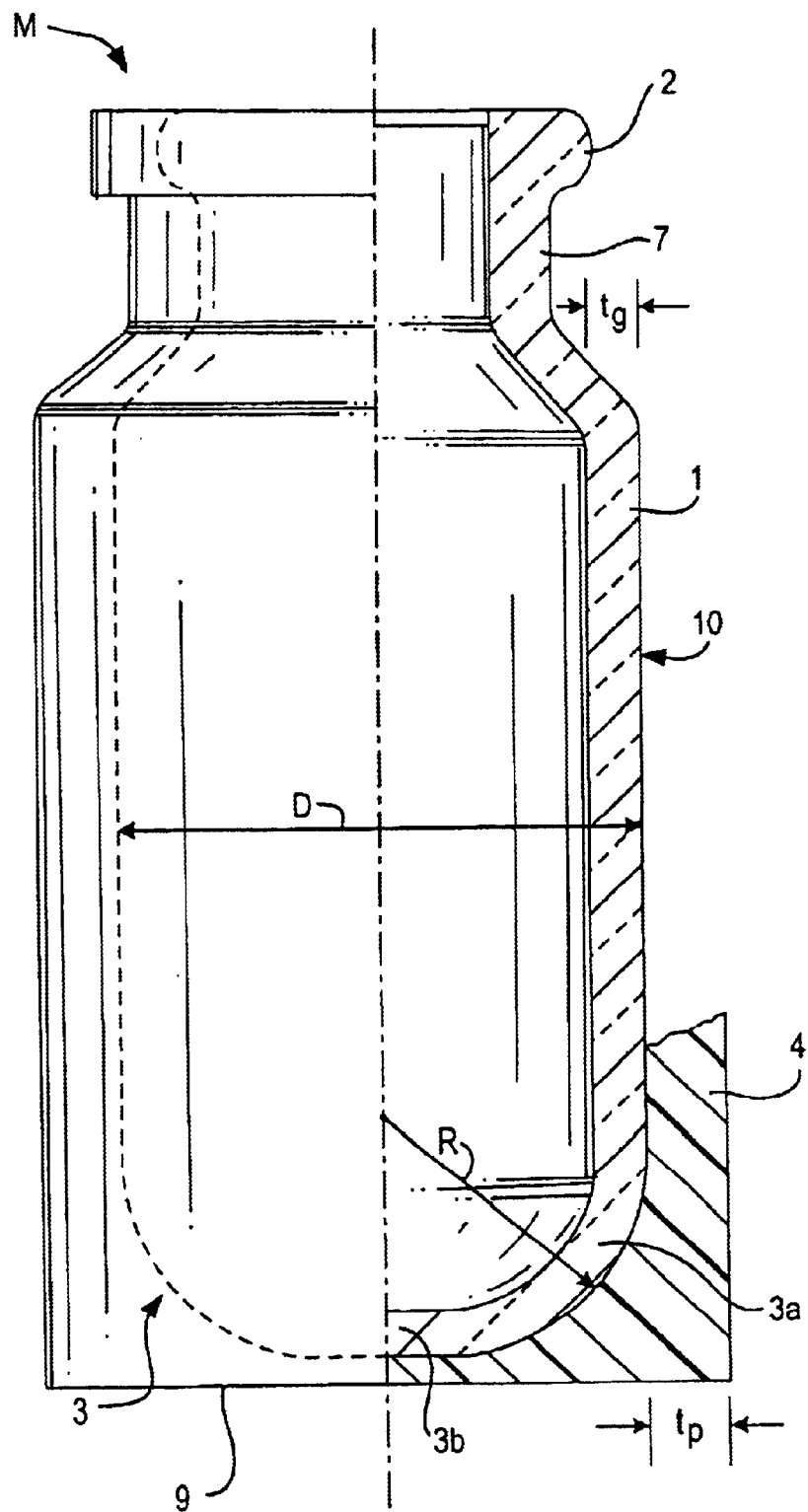
FIG. 1 is a partially side elevational, partially cross-sectional view of a glass container coated with a plastic coating in accordance with a first embodiment of the invention.

The glass containers covered by injection molding—glass inlets—described are used preferably in the medical field. They can comprise various configurations. For instance, FIG. 1 shows a partial longitudinal sectional, partial side view of a glass inlet 10 that is fillable with a medically effective substance sprayable as aerosol. A discharge opening or mouth M having a crimp or sealing rim 2 is formed on the container wall 1, to which a metering valve, i. e. a delivery element, can be attached. The sealing rim 2 is connected to the body of the glass inlet 10 via a neck section 7. The base section 3 bulges distinctly in the edge region 3a, but has a flat center section 3b with a relatively small surface.

A plastic coating 4—which is shown in FIG. 1 in an enlarged dimension and not in entirety—is applied to the glass inlet 10 by a method according to the reaction injection molding system. The plastic coating 4 is applied in the base section 3 in such a fashion that a flat standing surface 9 is produced over the cross-section of the glass container 10. In the upper section of the container, the coating extends to the sealing rim 2 of the discharge opening M, i.e., it includes the crimp rim 2. Due to the lower mold temperatures in the reaction injection molding method, however, the metering valve can also be placed on the crimp rim 2 before the coating is applied.

Additional embodiments of the closeable containers according to the invention are shown in FIGS. 2 to 5. Parts which are the same in the different embodiments are given the same reference number.

Figure 2:
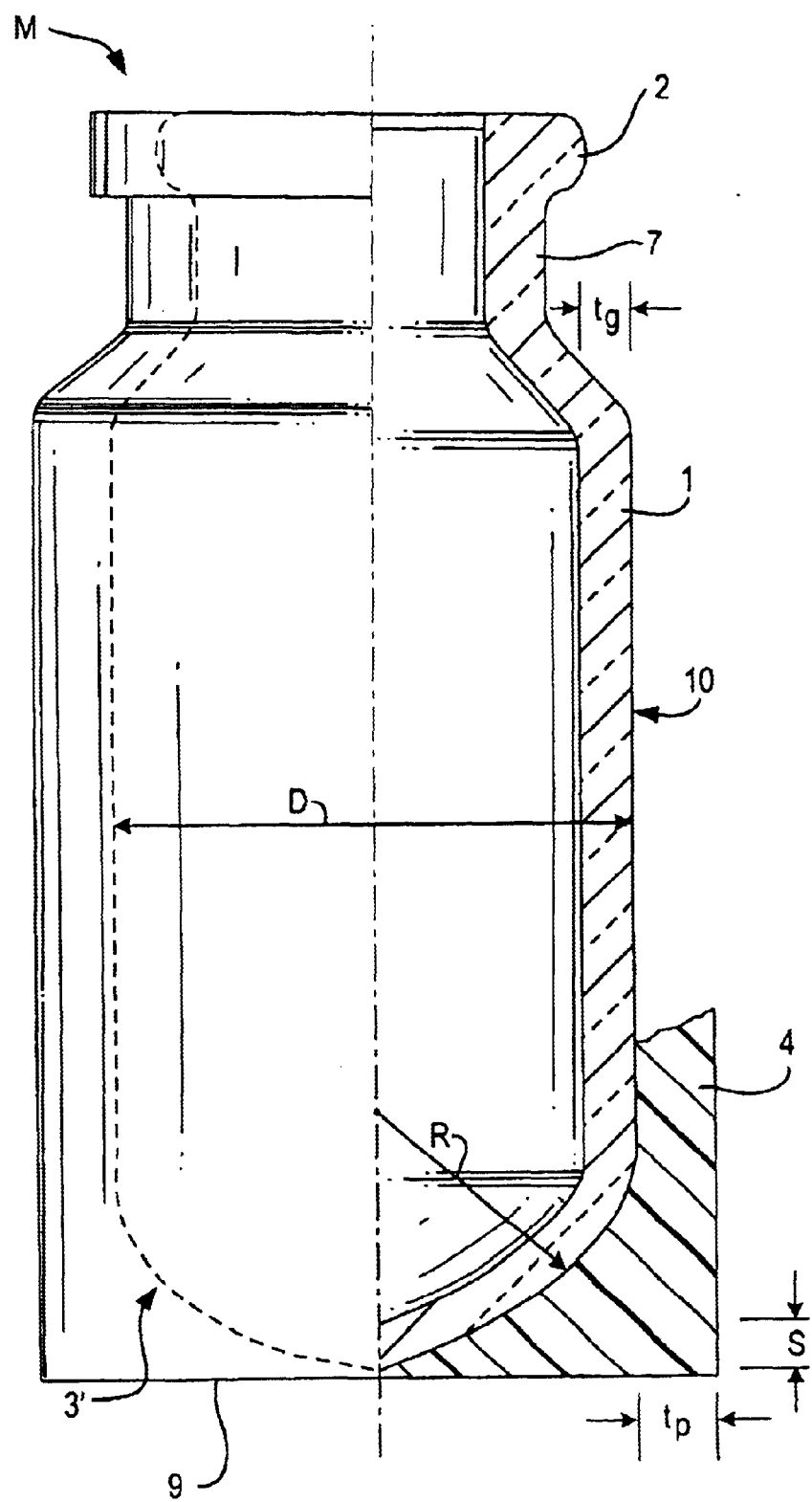
FIG. 2 is a partially side elevational, partially cross-sectional view of a glass container coated with a plastic coating in accordance with a second embodiment of the invention.

In another embodiment shown in FIG. 2, however, the glass inlets 10 are provided with a base section 3' that bulges outward in entirety, as shown in FIG. 2, because they can then withstand higher internal pressures.

The following relationship preferably exists for the base radius R, the container diameter D, and the dimension S of the outward bulge (shown in FIG. 2):

|   | Min | Max |
|---|---|---|
| S | 1 mm | D/2 |
| R | 5 mm | D/2 |

Otherwise, the glass inlet according to FIG. 2 is designed analogous in shape to the glass inlet according to FIG. 1.

In the embodiments shown in FIGS. 1 to 4 the glass inlets can have a container wall thickness, $t_g$, of 0.7 to 1 mm, and a plastic coating thickness, $t_p$, of 1 to 2 mm.

Instead of a crimp rim, the glass inlets can also comprise a DIN glass thread GL 45 K for a screw-in stopper.

Figure 3:
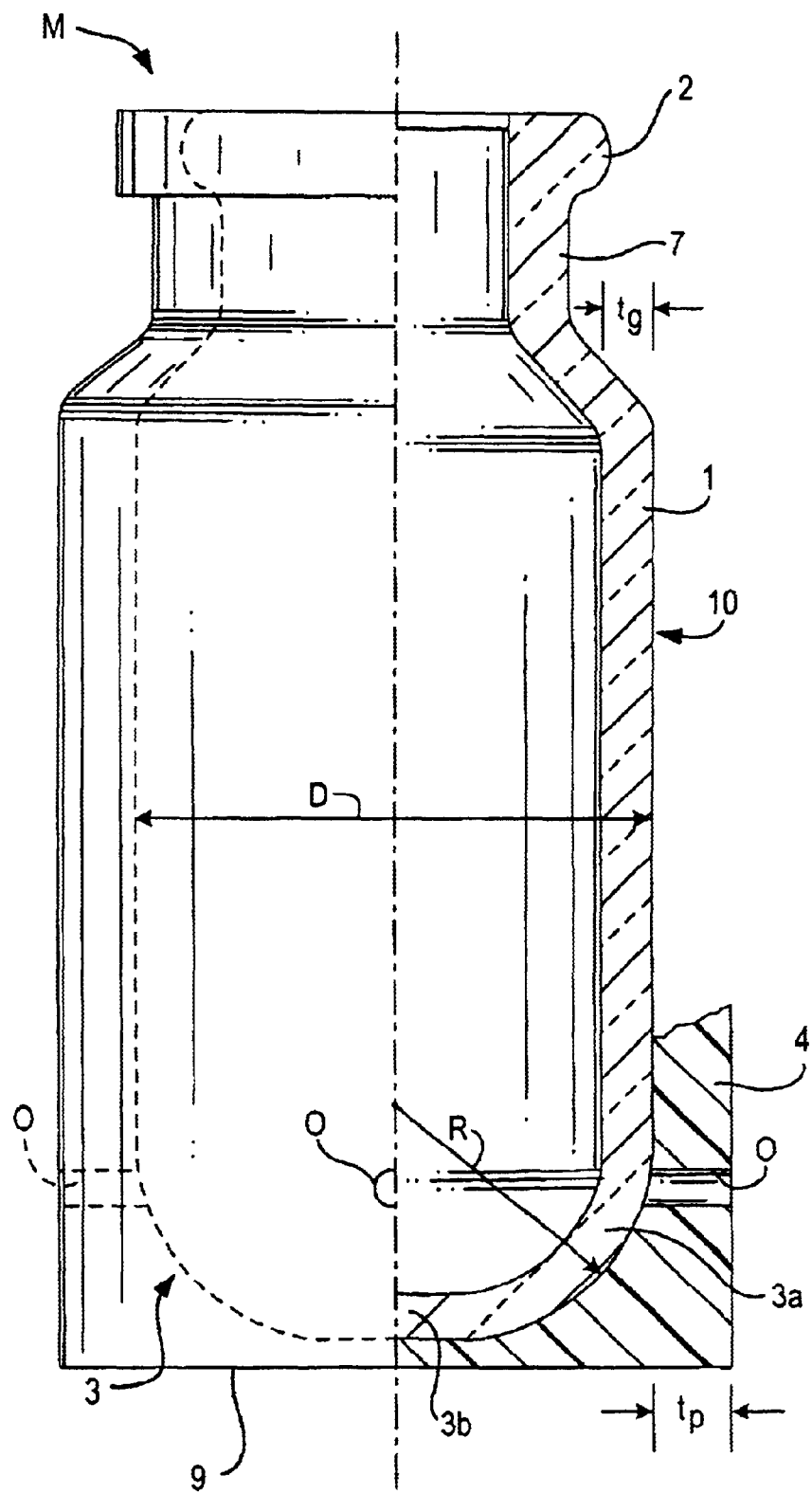
FIG. 3 is a partially side elevational, partially cross-sectional view of a glass container coated with a plastic coating in accordance with a third embodiment of the invention.

The embodiment of FIG. 3 is the same as the embodiment of FIG. 1, except that four through-going openings O are provided in the plastic coating 4 in the vicinity of the base section 3. These openings are arranged around the container in opposing pairs. These openings O have been described above. In the event that the glass inlet 10 bursts substance and propellant can escape through the openings O and thus ballooning of the plastic coating and subsequent bursting of it may be avoided.

Figure 4A:
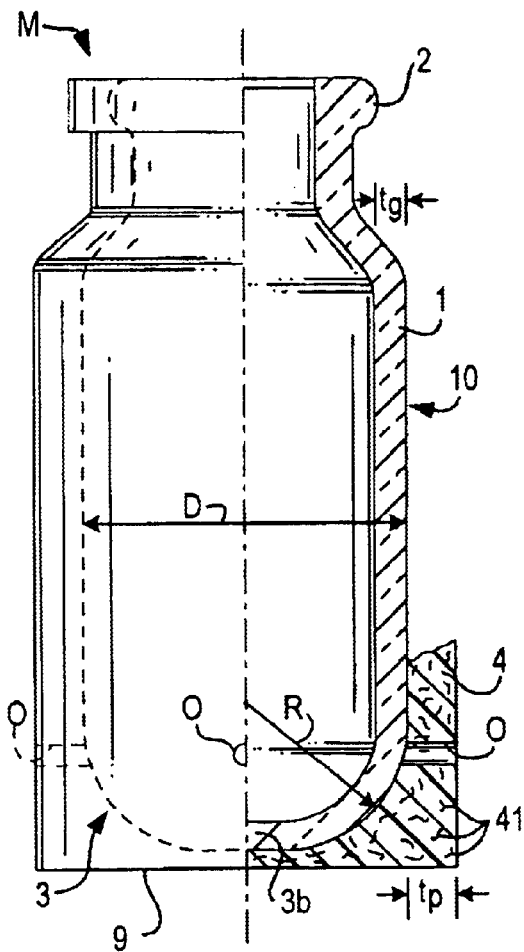
FIGS. 4a, 4b and 4c are respective partially side elevational, partially cross-sectional views of three additional embodiments of the glass container coated with a plastic coating in accordance with the invention.
Figure 4B:
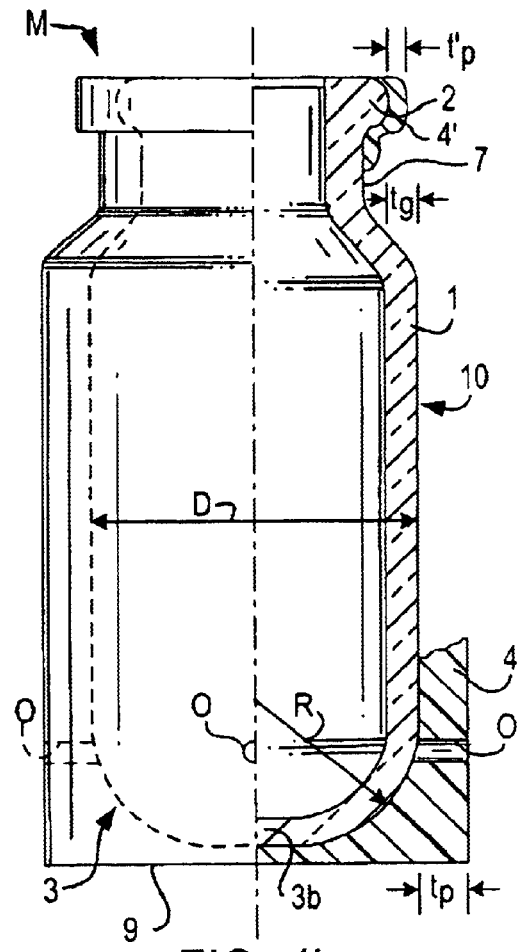
Figure 4C:
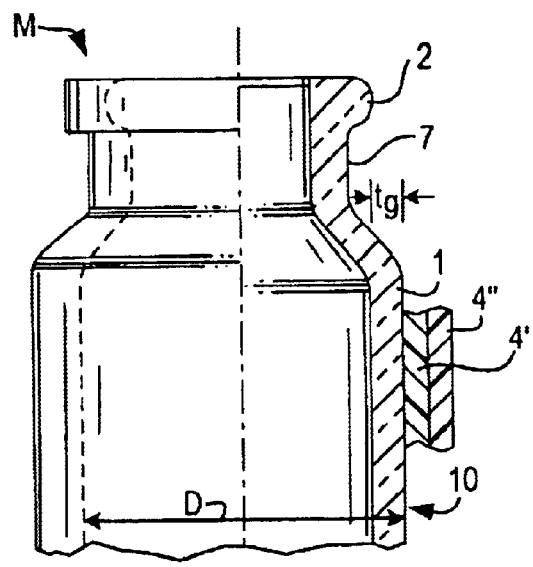

FIGS. 4a, 4b and 4c show several embodiments similar to FIG. 1. In some embodiments several different types of reactively cross-linkable plastics can be used to encase different regions or sections of the glass container 10. In the embodiment shown in FIG. 4a the same plastic coating 4 is provided in the base section 3 as in the case of FIG. 1, except that it is reinforced with fibers 41. In the embodiment shown in FIG. 4b a different plastic coating 4' made with a different reactively cross-linkable plastic can be provided in the vicinity of the sealing rim 2 and neck section 7 than in the base section 3. The plastic coating 4' can be harder than the plastic coating 4 and have other different properties. It also can have a different coating thickness $t'_p$. In an alternative embodiment shown in the cutaway view provided in FIG. 4c the body of the glass container 10 can have a multilayer plastic coating comprising two plastic layers 4' and 4" made with different reactively cross-linkable plastics.

Figure 5:
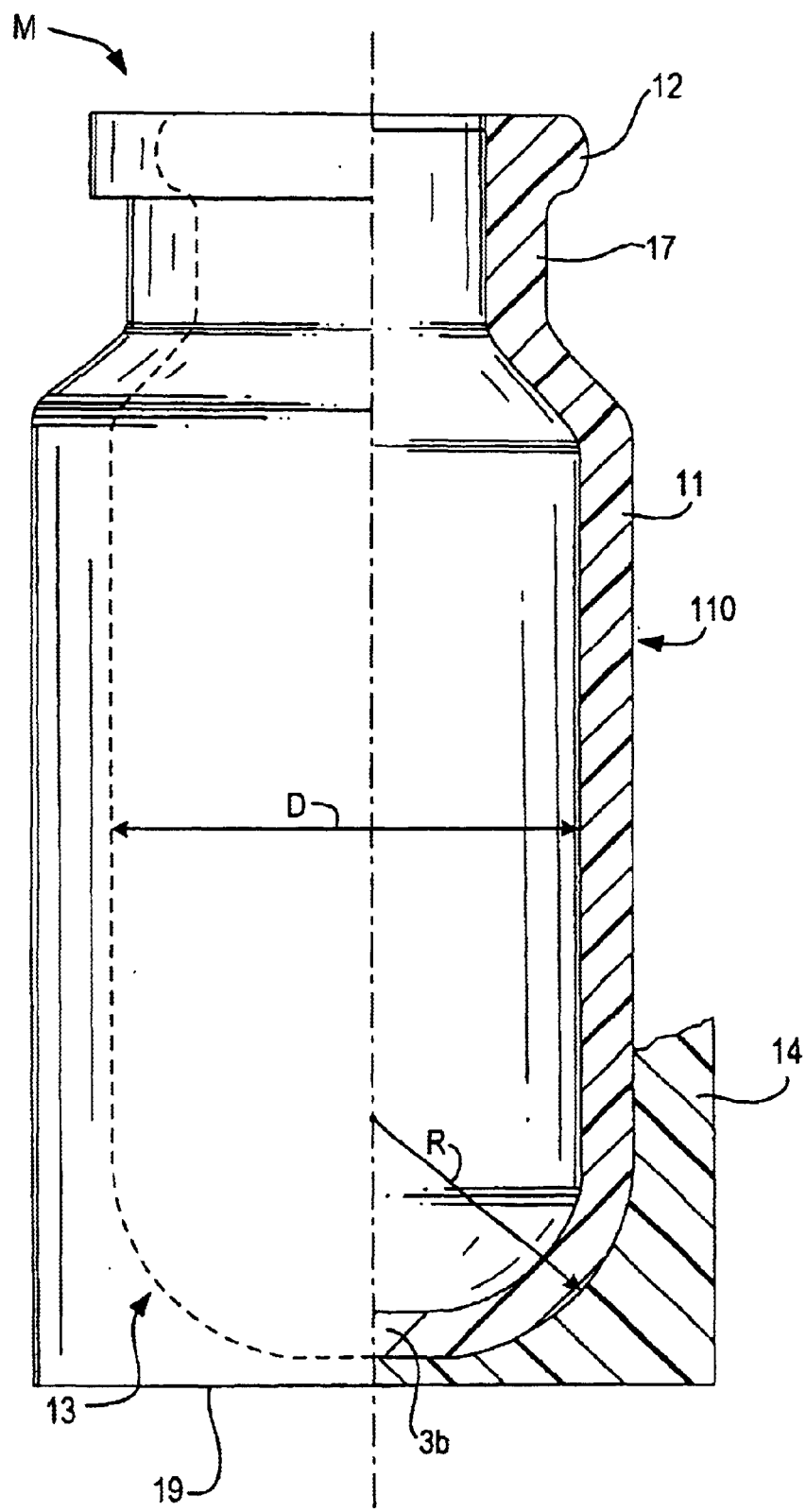
FIG. 5 is a partially side elevational, partially cross sectional view of a thermolabile plastic container coated with a plastic coating in accordance with the invention.

The RIM method is especially valuable to provide a plastic coating on a thermolabile plastic inlet 110, such as shown in FIG. 5, because of the comparatively low injection molding pressures and temperatures used in the RIM system, as mentioned in the above "summary of invention" section. FIG. 5 shows a thermolabile plastic inlet 110 provided with a plastic coating 14 on the container wall 11 made with a reactively cross-linkable plastic material. The plastic coating 14 extents from the bottom of the base section 13 over the neck section 17 and up to and including the sealing rim 12 of the inlet 110, although FIG. 5 does not show that it extends completely up to the rim 12. The resulting closeable container has a flat base surface 19.

In addition to the medical field described, the glass containers can also be used to store sprayable cosmetic products and to store/prepare beverages. The method according to the invention is also suited, therefore, to coat glass bottles for the production of carbonated mineral water when introducing $CO_2$ into tap water. The required pressure-loadability is thereby 12 bar, which indicates a TRG 300 test pressure of 18 bar. The volume of the bottles is typically 0.5 or 0.7 and 1.0 liter.

Figure 6:
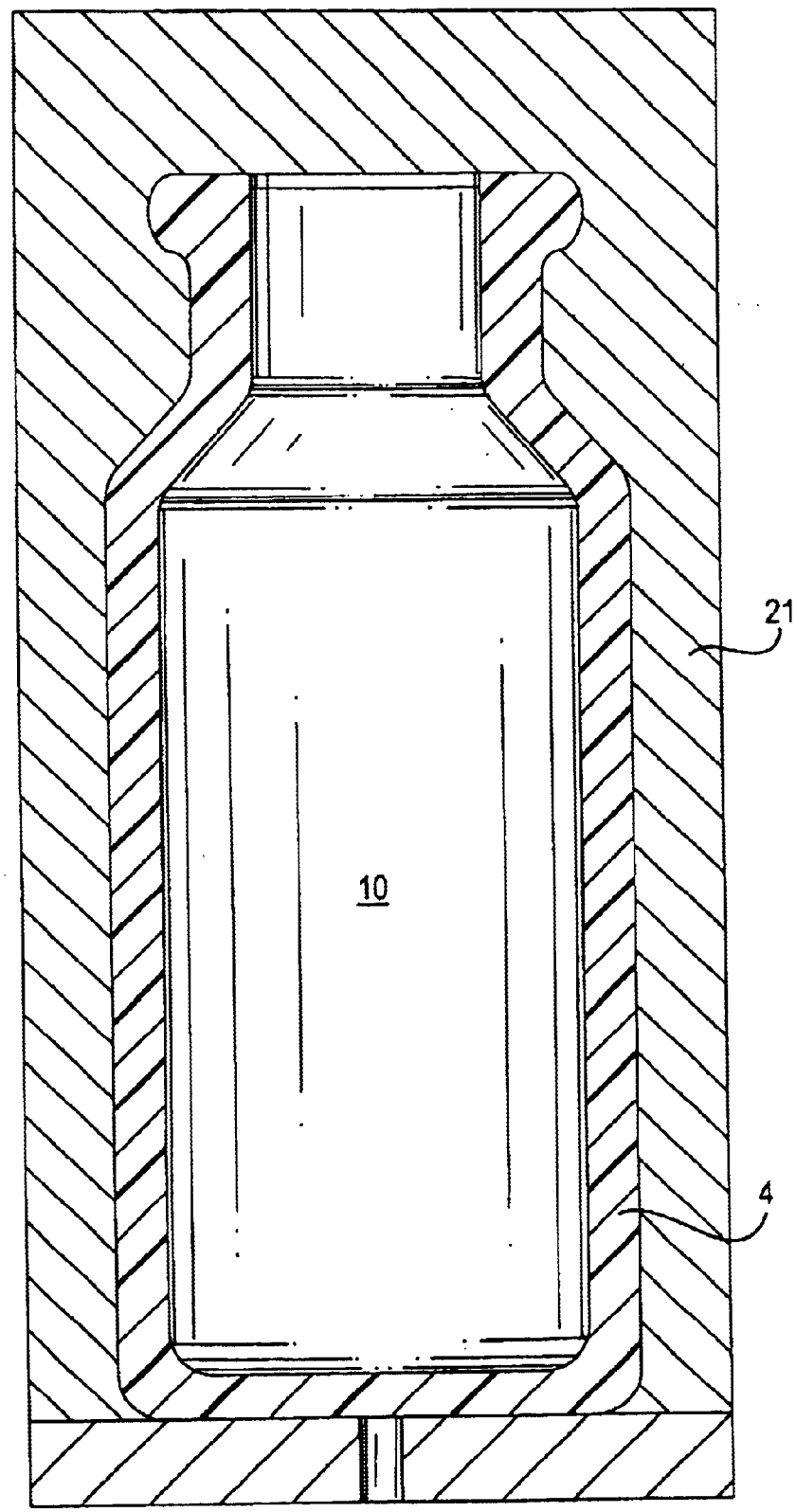
FIG. 6 is a cross-sectional view through a mold with a glass inlet during one stage of the reaction injection mold method of making the closeable container according to the invention.

FIG. 6 shows a step in the method of producing the closeable containers according to the invention, in which the glass inlet or container 10 is in a closed mold 21 surrounded by the reactively cross-linkable plastic. The mold 21 is used in the reaction injection molding method according to the invention to make the closeable container comprising the glass inlet 10 and the plastic coating 4 encasing it. The glass inlet 10 itself is made by well-known methods.

What is claimed is:

1. A closeable container comprising a glass bottle (10) and a plastic coating (4) applied to said glass bottle so as to encase said glass bottle, wherein said closeable container is made by a method comprising injecting at least one reactively cross-linkable plastic capable of being heat-softened into a mold (21) surrounding said glass bottle (10) and forming said plastic coating (4) around said glass bottle (10) from said at least one reactively cross-linkable plastic in said mold (21) by a reaction injection molding process;

wherein said glass bottle (10) is fillable under pressure with a sprayable substance and a propellant for spraying the sprayable substance, said glass bottle (10) has a base section (3) and a tapered neck section (7) with a bead-shaped sealing rim (2) bordering a mouth (M) of the glass bottle, said sealing rim (2) being formed for mechanical attachment of a delivery element to the sealing rim so that the glass bottle (10) is closable by the delivery element, and wherein said glass bottle is completely encased with said plastic coating (4) from said base section (3) to said sealing rim (2).

2. The closeable container as defined in claim 1, wherein said plastic coating (4) is provided with a plurality of through-going holes (O) for pressure compensation.

3. The closeable container as defined in claim 2, wherein said through-going holes (O) are located in the vicinity of said base section (3).

4. The closeable container as defined in claim 2, wherein said through-going holes (O) are arranged around said glass bottle in opposing pairs.

5. The closeable container as defined in claim 1, wherein said glass bottle is a glass inlet and said at least one reactively cross-linkable plastic is a reactive polyurethane system.

6. The closeable container as defined in claim 1, wherein said plastic coating (4) has a thickness that varies in a direction from a bottom of said glass bottle to a top of said glass bottle.

7. The closeable container as defined in claim 1, wherein said plastic coating (4) comprises different plastics arranged in multiple layers encasing said glass bottle (10), so that an outer layer has a density greater than inner ones of the multiple layers.

8. A closeable container comprising a glass bottle (10) and plastic coating (4) applied to said glass bottle so as to encase said glass bottle, wherein said closeable container is made by a method comprising injecting at least one reactively cross-linkable plastic capable of being heat-softened into a mold (21) surrounding said glass bottle (10) and forming said plastic coating (4) around said glass bottle (10) from said at least one reactively cross-linkable plastic in said mold (21) by a reaction injection molding process, wherein said glass bottle (10) is a glass inlet, said glass bottle (10) has a wall thickness ($t_g$) of from 0.7 to 1 mm, said glass bottle (10) has a volume of from 5 ml to 125 ml and said plastic coating (4) has a thickness ($t_p$) of 1 mm to 2 mm.

9. The closeable container as defined in claim 8, wherein said at least one reactively cross-linkable plastic is a reactive polyurethane system.

10. A closeable container comprising a glass bottle (10) and a plastic coating (4) applied to said glass bottle so as to encase said glass bottle, wherein said closeable container is made by a method comprising injecting at least one reactively cross-linkable plastic capable of being heat-softened into a mold (21) surrounding said glass bottle (10) and forming said plastic coating (4) around said glass bottle (10) from said at least one reactively cross-linkable plastic in said mold (21) by a reaction injection molding process, wherein said at least one reactively cross-linkable plastic comprises different reactively cross-linkable plastics arranged in succession in a direction from a bottom of said glass bottle to a top of said glass bottle.

11. A closeable container comprising a glass bottle (10) and a plastic coating (4) applied to said glass bottle so as to encase said glass bottle, wherein said closeable container is made by a method comprising injecting at least one reactively cross-linkable plastic capable of being heat-softened into a mold (21) surrounding said glass bottle (10) and forming said plastic coating (4) around said glass bottle (10) from said at least one reactively cross-linkable plastic in said mold (21) by a reaction injection molding process, wherein said at least one reactively cross-linkable plastic is reinforced with fiber (41).

12. A closeable container comprising a glass bottle (10) and a plastic coating (4) applied to said glass bottle so as to encase said glass bottle, wherein said closeable container is made by a method comprising injecting at least one reactively cross-linkable plastic capable of being heat-softened into a mold (21) surrounding said glass bottle (10) and forming said plastic coating (4) around said glass bottle (10) from said at least one reactively cross-linkable plastic in said mold (21) by a reaction injection molding process, wherein the glass bottle (10) has an outwardly bulging bottom to help withstand internal pressures.

13. A method of making a container, said container comprising a glass bottle (10) and a plastic coating (4) applied to said glass bottle so as to encase said glass bottle; said method comprising the steps of:
   a) injecting at least one reactively cross-linkable plastic capable of being heat-softened into a mold (21) surrounding said glass bottle (10); and
   b) forming said plastic coating (4) around said glass bottle (10) from said at least one reactively cross-linkable plastic in said mold (21) by a reaction injection molding process.

14. The method as defined in claim 13, wherein said at least one reactively cross-linkable plastic is injected into said mold at an injection pressure of less than 10 bar and said at least one reactively cross-linkable plastic is a reactive polyurethane system in accordance with the reaction injection molding process.

15. The method as defined in claim 13, wherein said glass bottle has an open mouth (M) during the injecting and the forming.

16. The method as defined in claim 13, wherein said glass bottle is closed by a delivery element during the injecting and the forming.

17. The method as defined in claim 13, wherein said glass bottle (10) is a glass inlet, said glass bottle (10) has a wall thickness ($t_g$) of from 0.7 to 1 mm, said glass bottle (10) has a volume of from 5 ml to 125 ml and said plastic coating (4) has a thickness ($t_p$) of 1 mm to 2 mm.

18. The method as defined in claim 13, wherein said glass bottle (10) is fillable under pressure with a sprayable substance and a propellant for spraying the sprayable substance, said glass bottle (10) has a base section (3) and a tapered neck section (7) with a bead-shaped sealing rim (2) bordering a mouth (M) of the glass bottle, said sealing rim (2) being formed for mechanical attachment of a delivery element to the sealing rim so that the glass bottle (10) is closable by the delivery element, and wherein said glass bottle is completely encased with said plastic coating (4) from said base section (3) to said sealing rim (2).

* * * * *